(12) United States Patent
Libal et al.

(10) Patent No.: US 9,251,633 B2
(45) Date of Patent: Feb. 2, 2016

(54) MONITORING ACCESS TO A LOCATION

(75) Inventors: Vit Libal, Prague (CZ); Valerie Guralnik, Mound, MN (US)

(73) Assignee: Honeywell International Inc., Morristown, NJ (US)

( * ) Notice: Subject to any disclaimer, the term of this patent is extended or adjusted under 35 U.S.C. 154(b) by 315 days.

(21) Appl. No.: 13/166,178

(22) Filed: Jun. 22, 2011

(65) Prior Publication Data

US 2012/0330611 A1 Dec. 27, 2012

(51) Int. Cl.
*G07C 9/00* (2006.01)
*G06F 15/16* (2006.01)
*G08B 31/00* (2006.01)

(52) U.S. Cl.
CPC ............. *G07C 9/00* (2013.01); *G07C 2209/08* (2013.01); *G08B 31/00* (2013.01)

(58) Field of Classification Search
CPC ........................................................ G07C 9/00
USPC ............................................ 702/179; 706/20
See application file for complete search history.

(56) References Cited

U.S. PATENT DOCUMENTS

| 2008/0290988 | A1* | 11/2008 | Crawford | 340/5.6 |
| 2009/0099988 | A1* | 4/2009 | Stokes et al. | 706/20 |
| 2009/0228980 | A1* | 9/2009 | Zingelewicz et al. | 726/22 |
| 2012/0169458 | A1* | 7/2012 | Dubois et al. | 340/5.3 |

OTHER PUBLICATIONS

Spiros Papadimitriou, et al. LOCI: Fast Outlier Detection Using the Local Correlation Integral, Intel Research Pittsburgh, Jul. 2002 (26 pgs.).

* cited by examiner

*Primary Examiner* — Andrew Schechter
*Assistant Examiner* — Daniel Kessie
(74) *Attorney, Agent, or Firm* — Brooks, Cameron & Huebsch, PLLC

(57) ABSTRACT

Devices, methods, and systems for monitoring access to a location are described herein. One or more method embodiments include determining data associated with an access event associated with a location, determining whether the access event is an anomalous access event using the data associated with the access event and a statistical model of data associated with a number of non-anomalous access events associated with the location, and assessing, if the access event is determined to be an anomalous access event, the anomalous access event. In various embodiments, assessing the anomalous access event includes at least one of determining an anomaly type associated with the anomalous access event, determining an anomaly classification confidence associated with the anomalous access event, determining an anomaly severity associated with the anomalous access event, and determining a reliability associated with the statistical model.

15 Claims, 1 Drawing Sheet

MONITORING ACCESS TO A LOCATION

TECHNICAL FIELD

The present disclosure relates to devices, methods, and systems for monitoring access to a location.

BACKGROUND

Access to a location, such as, for example, a secured building or facility (e.g., a room in the building or facility) may be controlled (e.g., limited and/or restricted) and/or monitored by an access control system. For example, an individual attempting to enter such a location may need to present a valid identification token, such as, for instance, a key card, magnetic badge, wireless identification tag, etc., to the access control system (e.g., to a reader at the entrance of the location) in order to enter the location. The access control system may monitor (e.g., track and/or record) who is accessing the location, when the access occurs, and/or how long the access lasts.

Based on such access control and/or monitoring, the access control system may provide an indication (e.g., to an operator of the access control system) that the location may be being accessed in an anomalous (e.g., abnormal, unusual, and/or unexpected) manner. However, previous access control systems may not assess the anomalous access, or may provide an assessment of the anomalous access that includes complex access pattern models (e.g., statistical models trained by observed data) that can be difficult for the operator to understand. For example, the operator may need a deep knowledge and/or understanding of statistics and/or pattern recognition to understand the assessment provided by previous access control systems. Accordingly, the operator may not be able to determine whether the anomalous access represents a significant gap in the security of the location and/or threat to the security of the location, and, if so, what can be done in response to the anomalous access (e.g., how the security gap and/or threat can be corrected).

DETAILED DESCRIPTION

Devices, methods, and systems for monitoring access to a location are described herein. One or more method embodiments include determining data associated with an access event associated with a location, determining whether the access event is an anomalous access event using the data associated with the access event and a statistical model of data associated with a number of non-anomalous access events associated with the location, and assessing, if the access event is determined to be an anomalous access event, the anomalous access event. In various embodiments, assessing the anomalous access event includes at least one of determining an anomaly type associated with the anomalous access event, determining an anomaly classification confidence associated with the anomalous access event, determining an anomaly severity associated with the anomalous access event, and determining a reliability associated with the statistical model.

Devices, methods, and/or systems in accordance with one or more embodiments of the present disclosure can determine whether a location is being accessed in an anomalous (e.g., abnormal, unusual, and/or unexpected) manner. Accordingly, the assessment may be used to determine whether the anomalous access represents a significant gap in and/or threat to the security of the location, and, if so, what can be done in response to the anomalous access (e.g., how the security gap can be closed).

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of access events" can refer to one or more access events.

Figure 1:
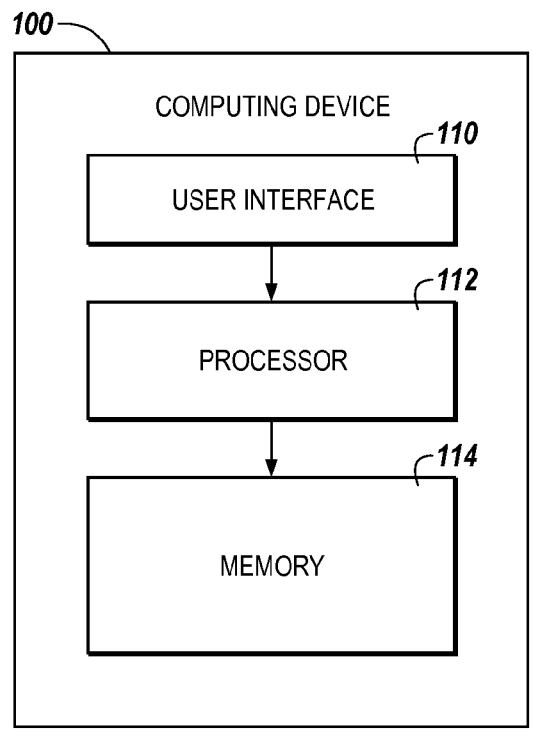
FIG. 1 illustrates a computing device for monitoring access to a location in accordance with one or more embodiments of the present disclosure.

FIG. 1 illustrates a computing device 100 for monitoring access to a location in accordance with one or more embodiments of the present disclosure. Computing device 100 can be, for example, a desktop computing device, a laptop computing device, or a portable handheld computing device, such as, for instance, a portable handheld mobile phone, media player, or scanner. However, embodiments of the present disclosure are not limited to a particular type of computing device.

In some embodiments, computing device 100 can be a part of an access control and/or monitoring system. For example, computing device 100 can be part of an access control device (e.g., card reader).

As shown in FIG. 1, computing device 100 includes a user interface 110. User interface 110 can be a graphic user interface (GUI) that can provide (e.g., display and/or present) and/or receive information (e.g., data and/or images) to and/or from a user (e.g., operator) of computing device 100. For example, user interface 110 can include a screen that can provide information to a user of computing device 100 and/or receive information entered into a display on the screen by the user. However, embodiments of the present disclosure are not limited to a particular type of user interface.

As shown in FIG. 1, computing device 100 includes a processor 112 and a memory 114. Although not illustrated in FIG. 1, memory 114 can be coupled to processor 112.

Memory 114 can be volatile or nonvolatile memory. Memory 114 can also be removable (e.g., portable) memory, or non-removable (e.g., internal) memory. For example, memory 114 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 114 is illustrated as being located in computing device 100, embodiments of the present disclosure are not so limited. For example, memory 114 can also be located internal to another computing resource (e.g., enabling computer readable instructions to be downloaded over the Internet or another wired or wireless connection).

Figure 2:
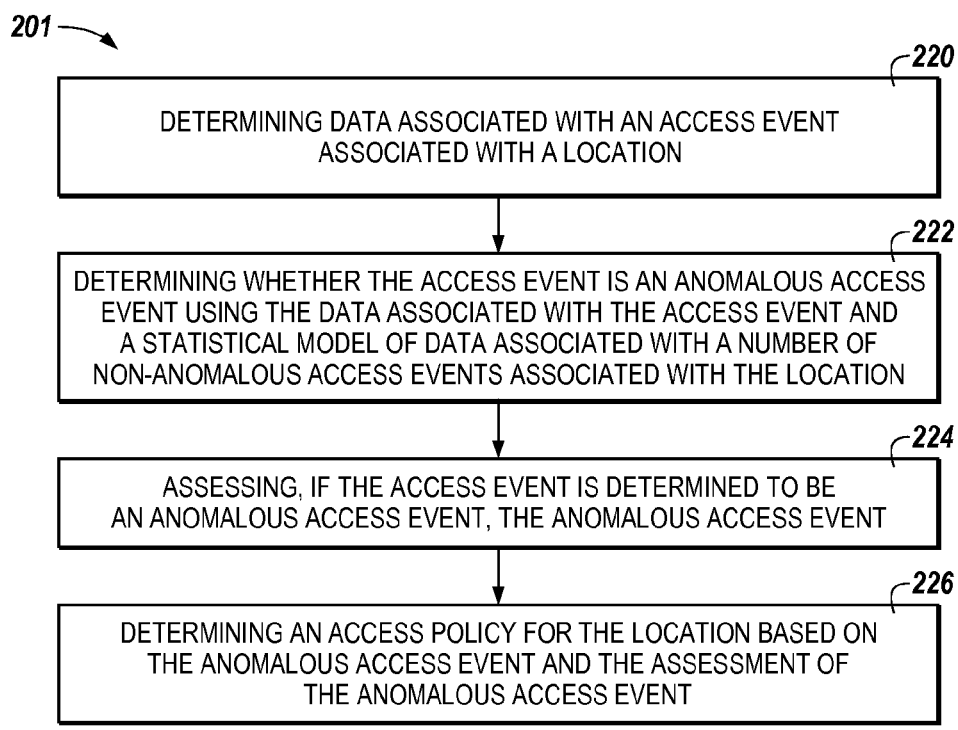
FIG. 2 illustrates a method for monitoring access to a location in accordance with one or more embodiments of the present disclosure.

In some embodiments, memory 114 can store a statistical model of data associated with a number of non-anomalous (e.g., normal, usual, and/or expected) access events associated with a location, which will be further described herein (e.g., in connection with FIG. 2). The statistical model can be built (e.g., created) using (e.g., from) historical data, as will be further described herein (e.g., in connection with FIG. 2). Memory 114 can also store executable instructions, such as, for example, computer readable instructions (e.g., software), for monitoring access to a location in accordance with one or more embodiments of the present disclosure.

Processor 112 can execute the executable instructions stored in memory 114 to monitor access to a location accordance with one or more embodiments of the present disclosure. For example, processor 112 can execute the executable instructions stored in memory 114 to perform one or more of the methods for monitoring access to a location further described herein (e.g., in connection with FIG. 2).

FIG. 2 illustrates a method 201 for monitoring access to a location in accordance with one or more embodiments of the present disclosure. Method 201 can be performed, for example, by computing device 100 previously described in connection with FIG. 1.

At block 220, method 201 includes determining data associated with an access event associated with a location. The location can be, for example, a building and/or facility (e.g., a space and/or room in the building and/or facility). Additionally, the location can be a secured location (e.g., access to the location may be controlled, limited, and/or restricted). For example, to enter the location, an individual may need to present a valid identification token, such as, for instance, a key card, magnetic badge, wireless identification tag, etc., to an access control system associated with the location (e.g., a reader located at the entrance of the location).

The access event associated with the location can include, for example, an individual accessing the location. For instance, the access event can include an individual obtaining physical access to (e.g., entering) the location.

The data associated with the access event can include, for example, the time of the access event (e.g., the time of day the access event occurs), the duration of the access event (e.g., how long the individual is in the location), the day of the access event (e.g., the date and/or day of the week the access event occurs), an identification of the individual accessing the location, a time of a first access event associated with the location in a day (e.g., the time of day the location is first accessed), and/or a frequency of access events associated with the location. The data can, for example, be received from the reader of the access control system. For instance, the reader can record the data when the access event occurs and send (e.g., transmit) the data to the computing device via a wired or wireless network.

At block 222, method 201 includes determining whether the access event is an anomalous (e.g., abnormal, unusual, and/or unexpected) access event using the data associated with the access event and a statistical model of data associated with a number of non-anomalous (e.g., normal, usual, and/or expected) access events associated with the location. The statistical model can, for example, be built (e.g., created) using (e.g., from) historical data associated with anomalous access events and/or non-anomalous access events (e.g., the number of non-anomalous access events) associated with the location, the individual, a group of locations, and/or a group of individuals. That is, the statistical model can be built using data associated with previous anomalous and/or non-anomalous access events associated with the location, the individual, a group of locations, and/or a group of individuals, among other suitable data for building the model.

In some embodiments, determining whether the access event is an anomalous access event can include comparing the data associated with the access event to the statistical model (e.g., using pattern recognition techniques). For instance, the statistical model can include a mean data distribution of the data associated with the number of non-anomalous access events, and a local data distribution density on a neighborhood (e.g., portion) of the data associated with the access event can be compared to the mean data distribution on similar neighborhoods of neighboring data. If the comparison indicates that the data associated with the access event does not fit the statistical model, the access event may be an anomalous access event. For instance, the access event may be an anomalous access event if its data deviates from the statistical model by at least a particular amount (e.g., by at least a particular number of standard deviations).

The data associated with the non-anomalous (e.g., historical) access events can include, for example, the times (e.g., times of day) of the non-anomalous access events, the durations of the non-anomalous access events, the days (e.g., dates and/or days of the week) of the non-anomalous access events, and/or identifications of the individuals accessing the location during the non-anomalous access event. The data can, for example, be received from the reader of the access control system, in a manner analogous to that previously described in connection with the data associated with the access event. In some embodiments, the data may have been previously determined (e.g., determined before the data associated with the access event is determined).

The non-anomalous access events can correspond to individuals accessing the location (e.g., obtaining physical access to the location) in a normal, usual, and/or expected manner. For example, the non-anomalous access events can correspond to individuals accessing the location at usual times and days (e.g., during normal working hours), individuals staying in the location for usual amounts of times, and/or individuals accessing locations that they usually access. That is, the statistical model can be a model of individuals' normal, usual, and/or expected behavior in connection with accessing the location.

In contrast, an anomalous access event corresponds to an individual accessing the location in an abnormal, unusual, and/or unexpected manner. For example, an anomalous access event can correspond to an individual accessing the location at an unusual time and/or day (e.g., outside of normal working hours as determined by the model), an individual staying in the location for an unusual amount of time (e.g., for too long a time), an individual accessing a location that he or she usually does not access, and/or an individual accessing two different locations in an unusually short time, among other event types.

Although not shown in FIG. 2, method 201 can include determining the statistical model. That is, the statistical model can be determined by computing device 100. In some embodiments, the statistical model can be pre-determined (e.g., determined before the data associated with the access event is determined). The statistical model can be stored in computing device 100 (e.g., memory 114), as previously described herein in connection with FIG. 1.

At block 224, method 201 includes assessing, if the access event is determined to be an anomalous access event, the anomalous access event. That is, if the access event is determined to be an anomalous access event at block 222, method 201 includes assessing the anomalous access event at block 224.

Assessing the anomalous access event can include, for example, determining an anomaly type associated with the anomalous access event, determining an anomaly classification confidence associated with the anomalous access event, determining an anomaly severity associated with the anomalous access event, and/or determining a reliability associated with the statistical model. That is, the anomaly type, anomaly classification confidence, and/or anomaly severity can be attributes of the anomaly, and/or the reliability associated with the statistical model can be an attribute of the statistical model, that can be used to assess (e.g., describe and/or understand) the anomalous access event. However, the anomaly type, anomaly classification confidence, anomaly severity, and/or reliability may not affect the determination made at block 222 of whether the access event is an anomalous access event.

The anomaly type associated with the anomalous access event can be, for example, one of the following categorical quantities: an edge anomaly, a cluster anomaly, or a gap anomaly. An edge anomaly can correspond to an anomalous access event (e.g., data associated with the anomalous access event) that is at and/or near the edge of the statistical model (e.g., the usual data range). A cluster anomaly can correspond to an anomalous access event belonging to a small cluster of data points of similar values indicating that the data point belongs to an anomalous pattern. A gap anomaly can correspond to an anomalous access event that resides within the statistical model, but has a value that does not occur frequently.

As an example, if an individual usually accesses a location during the normal working hours of 8:00 am to 4:00 pm, but not during the lunch hour of 12:00 pm to 1:00 pm, an access event of the location by the individual at 7:45 am may be an edge anomaly, an access event of the location by the individual at 12:30 pm may be a gap anomaly, and several access events of the location by the individual at 9:00 pm may be a cluster anomaly.

In some embodiments, a number of equations may be used to determine the anomaly type associated with an anomalous access event. For example, an anomalous data point a associated with the anomalous access event may be an edge anomaly if, for at least one data space dimension, the following statement is true:

($\{\forall x > a: x$ is not an anomaly$\} \land \{\forall y < a: y$ is an anomaly$\}$)
$\lor (\{\forall x < a: x$ is not an anomaly$\} \land \{\forall y > a: y$ is an anomaly$\}$)

where x and y are other data points in the data set (e.g., in the statistical model). As an additional example, an anomalous data point a associated with the anomalous access event may be a cluster anomaly if, for at least one data space dimension, the following statement is true:

$\{\exists x > a: x$ is not an anomaly$\} \land \{\exists y < a: y$ is not an anomaly$\}$
$\land \{\exists B = [b_i], i = 1, 2, \ldots, N, N > T: x > b_i \land y < b_i\}$ where x, y, and $b_i$ are other data points in the data set, N and T are positive integer numbers, and T is a pre-defined threshold determining the cluster size. As an additional example, an anomalous data point a associated with the anomalous access event may be a gap anomaly if, for at least one data space dimension, the following statement is true:

$\{\exists x > a: x$ is not an anomaly$\} \land \{\exists y < a: y$ is not an anomaly$\}$
$\land$ a is not a cluster anomaly$\}$ where x and y are other points in the data set. However, embodiments of the present disclosure are not limited to any particular equations for determining the anomaly type associated with an anomalous access event.

The anomaly classification confidence associated with the anomalous access event can, for example, represent a confidence associated with the determination made at block 222 that the access event is an anomalous access event (e.g., a confidence that the determination that the access event is an anomalous access event is correct). In some embodiments, the anomaly classification confidence can be represented as a numerical value, with the numerical value increasing as the anomaly classification confidence increases. For example, the anomaly classification confidence can be represented as a numerical value between 0 and 1, with 0 indicating a low anomaly classification confidence (e.g., a high uncertainty that the access event is actually an anomalous access event) and 1 indicating a high anomaly classification confidence (e.g., a low and/or zero uncertainty that the access event is actually an anomalous access event).

In some embodiments, the anomaly classification confidence can be represented in words. For example, the anomaly classification confidence can be represented as low, medium, or high, with low indicating a low anomaly classification confidence, medium indicating a medium anomaly classification confidence, and high indicating a high anomaly classification confidence.

The anomaly classification confidence can be determined, for example, based on the relative difference between a local data distribution density around the data point associated with the anomalous access event and the three sigma threshold for the local data distribution density. For instance, if the local data distribution density around the data point is significantly far away from the three sigma threshold, the anomaly classification confidence may be 1, and if the local data distribution density around the data point is equal to or near the three sigma threshold, the anomaly classification confidence may be 0. Such an example could follow the equation:

$$C(x) = 1 - \frac{1}{1 + 2 \cdot \frac{(p(x) - p_T)^2}{\sigma^2}}$$

where x is the data point associated with the anomalous access event, p(x) is the local data distribution density estimated at given data point x, $p_T$ is the density threshold value, $\sigma$ is a standard deviation of the local data distribution densities calculated at some pre-specified neighborhood of given data point x, and C(x) is the anomaly classification confidence value for given data point x. However, embodiments of the present disclosure are not limited to a particular equation for determining the anomaly classification confidence associated with an anomalous access event.

Additionally, in embodiments in which the anomaly classification confidence is represented in words (e.g., low, medium, high), thresholds can be used to determine the anomaly classification confidence. For example, an anomaly classification confidence can be represented as low if the anomaly classification confidence has a value of less than 0.25, medium if the anomaly classification confidence has a value equal to or greater than 0.25 and less than 0.75, and high if the anomaly classification confidence has a value equal to or greater than 0.75. However, embodiments of the present disclosure are not limited to particular thresholds.

The anomaly severity associated with the anomalous access event can, for example, represent an amount of seriousness with which the anomalous access event should be treated. The anomaly severity associated with the anomalous access event can be based on, for example, a pre-defined level of security associated with the location being accessed (e.g., the higher the level of security associated with the location, the higher the anomaly severity), an amount of difference between the data associated with the anomalous access event and the statistical model (e.g., the severity associated with a day-shift employee accessing a location during the late evening may be higher than the day-shift employee accessing the location early in the afternoon), a level of security associated with an individual and/or group of individuals access the location such as, for instance, the individual associated with the access event (e.g., the person who is accessing the location), and/or a level of security associated with the time of the access event.

As an example, the anomaly severity can be determined by multiplying the distance between the data associated with the anomalous access event and the usual data range by a pre-determined severity factor set for different combinations of individual, group, location, and access time zones. Such an example could follow the equation:

$$S(x) = \text{dist}[x - x_R(u,r,g,z)] \cdot k(u,r,g,z)$$

where x is the data point associated with the anomalous access event, u is an identification of the individual associated with data point x, g is an identification of a group with which the individual is associated, r is an identification of the location associated with data point x, z is a time zone associated with data point x (e.g., a range of time within which the anomalous access event occurs), $x_R(u,r,g,z)$ is the nearest data point within the usual data range for the individual, group, location, and time zone associated with data point x, dist is a distance defined on the data space (e.g., Euclidian distance), $k(u,r,g,z)$ is the pre-determined severity factor for the individual, group, location, and time zone associated with data point x (e.g., by a lookup table), and S(x) is the anomaly severity for data point x. However, embodiments of the present disclosure are not limited to a particular equation for determining the anomaly severity associated with an anomalous access event.

As an additional example, the anomaly severity can be determined based on what part (e.g., room(s)) of the location is being accessed and what type of assets may be compromised as a result of the access. In such an example, the distance between the data associated with the anomalous access event and the usual data range may have less of an effect on the anomaly severity than the part of the location being accessed and the type of assets being compromised.

The reliability associated with the statistical model can be based on, for example, the amount of data associated with (e.g., used to create) the statistical model used to make the determination at block 222 that the access event is an anomalous access event (e.g., the reliability associated with the statistical model can represent the extent to which the assumption of the validity of the statistical model is satisfied). For example, the more data associated with the statistical model, the greater the reliability associated with the statistical model. As an additional example, a small amount of data may be associated with the behavior of a new employee (e.g., the new employee may be associated with a small number of non-anomalous access events), and accordingly the reliability associated with the statistical model associated with the new employee may be low.

In some embodiments, the statistical model may be continuously updated with new data associated with newly occurring non-anomalous access events. Further, because the local data distributions may be taken into account when determining at block 222 whether the access event is an anomalous access event, the reliability may vary across different regions of the data space. Accordingly, the reliability associated with the statistical model may increase with time. However, in some instances, some areas in the data space may remain underrepresented, which may decrease the reliability associated with the statistical model.

As an example, the reliability associated with the statistical model can be expressed as a function of the amount of data points present in a pre-defined neighborhood of the data point associated with the anomalous access event. Such an example could follow the equation:

$$R(x) = 1 - \exp\left[\left(\frac{n_{SN}(x)^6}{20}\right)\right]$$

where x is the data point associated with the anomalous access event, $n_{SN}(x)$ is the amount of data points present in the pre-defined neighborhood of given data point x, and R(x) is the reliability associated with the statistical model for given data point x. However, embodiments of the present disclosure are not limited to a particular equation for determining the reliability associated with the statistical model.

Although not shown in FIG. 2, method 201 can include providing the assessment of the anomalous access event (e.g., the determined anomaly type, classification confidence, and/or severity associated with the anomalous access event, and/or the determined reliability associated with the statistical model) to a user of computing device 100. For example, the assessment can be provided (e.g., displayed and/or presented) to the user on user interface 110 previously described in connection with FIG. 1. The user can be, for example, an operator of computing device 100 (e.g., an operator of the access control and/or monitoring system).

The user can use the assessment to determine, for example, whether the anomalous access event represents a significant gap in and/or threat to the security of the location, and, if so, what can be done in response to the anomalous access (e.g., how the security gap can be closed). For example, the user can use the assessment to determine an access policy for the location, as will be further described herein.

For instance, in some embodiments, the user can be provided with a single value (e.g., a single quantity and/or number) that represents the assessment of the anomalous access event. That is, the user can be provided with a single value that represents the determined anomaly type associated with the anomalous access event, a single value that represents the determined anomaly classification confidence associated with the anomalous access event, a single value that represents the determined anomaly severity associated with the anomalous access event, and/or a single value that represents the determined reliability associated with the statistical model. The single value(s) may indicate that the anomalous access event represents a significant gap in and/or threat to the security of the location if, for example, the single value(s) meet(s) or exceed(s) a particular threshold(s).

Providing the user with a single value that represents the assessment of the anomalous access event (e.g., a single value that represents the anomaly classification confidence associated with the anomalous access event and a single value that represents the anomaly severity associated with the anomalous access event) can make it easier for the user to understand the assessment. For example, if the user is provided with a single value that represents the assessment (e.g., a single value that represents the anomaly classification confidence and a single value that represents the anomaly severity), the user may not need a deep knowledge and/or understanding of statistics and/or pattern recognition in order to understand the assessment (e.g., the user may only need to recognize whether the single value meets or exceeds a particular threshold). Accordingly, providing the user with a single value that represents the assessment can make it easier for the user to use the assessment to determine whether the anomalous access event represents a significant gap in and/or threat to the security of the location, and, if so, what can be done in response to the anomalous access.

In some embodiments, the assessment of the anomalous access event can be automatically processed by computing device 100 (e.g., by processor 112 previously described in connection with FIG. 1). For example, computing device 100 can automatically use the assessment to determine whether the anomalous access event represents a significant gap in and/or threat to the security of the location, and, if so, what can be done in response to the anomalous access (e.g., determine an access policy for the location, as will be further described herein).

At block 226, method 201 includes determining an access policy (e.g., an access rule) for the location (e.g., determining whether to change a pre-defined access policy and/or creating a new access policy to prevent future anomalous access to the location) based on the anomalous access event (e.g., the data associated with the anomalous access event) and the assessment of the anomalous access event. For instance, if the assessment of the anomalous access event indicates to computing device 100 (e.g., processor 112) and/or the user (e.g., operator) of computing device 100 that the anomalous access event represents a significant gap in and/or threat to the security of the location (e.g., if the value that represents the assessment of the anomalous access event meets or exceeds a particular threshold), computing device 100 and/or the user of computing device 100 can determine an access policy that would prevent access events similar to the anomalous access event (e.g., access events by the same individual and/or group of individuals associated with the anomalous access event and/or future access events at a similar time, day, and/or duration as the anomalous access event) from occurring in the future. As an example, if the anomalous access event corresponds to an individual accessing the location outside of the individual's normal working hours, and the assessment of the anomalous access event indicates that this represents a significant gap in and/or threat to the security of the location, the determined access policy may restrict the individual's access to the location to the individual's normal working hours.

As such, the access policy can be used to control (e.g., limit and/or restrict) access to the location. For example, the access policy can identify an individual and/or group of individuals authorized to access the location, a time(s) (e.g., a zone(s) and/or range(s) of time) when access to the location is authorized, a duration(s) (e.g., length(s) of time) for which access to the location is authorized, a day(s) (e.g., date(s) and/or day(s) of the week) when access to the location is authorized, and/or a space(s) (e.g., room(s)) within the location where access is authorized. To access the location, an individual may present a valid identification token (e.g., a key card, magnetic badge, wireless identification tag, etc.) to the access control system (e.g., to a reader at the entrance of the location) that identifies the individual as an individual authorized to access the location and/or as part of the group of individuals authorized to access the location, and access may be granted to the individual if it is at an authorized time, duration, day, and/or space.

In some embodiments, determining the access policy can include determining whether to change a pre-existing access policy for the location. That is, in some embodiments, method 201 can include changing a pre-existing access policy for the location based on the anomalous access event and the assessment of the anomalous access event at block 226.

The pre-existing access policy can be, for example, an access policy for the location (e.g., to control access to the location) that was set, defined, and/or installed, for instance before and/or during the initial installation and/or initialization of the access control system. The pre-existing access policy may have been determined, for example, using prior knowledge about the individuals accessing the location and their access needs.

As an example, a pre-existing access policy may grant a group of individuals (e.g., a maintenance and/or custodial crew) access to the location from 6:00 pm to 8:00 pm (e.g., to maintain and/or clean the location). However, using one or more embodiments of the present disclosure, it may be determined that the group will usually access the location from 7:15 pm to 7:45 pm (e.g., because the crew does not need the entire two hour period to perform their maintenance and/or cleaning). As a result, the pre-existing access policy may be changed to grant the group of individuals access to the location from 7:15 pm to 7:45 pm.

As an additional example, the pre-existing access policy may control access to the location for a group (e.g., at least two) individuals, as previously described herein, but only one of the individuals may be associated with the anomalous access event (e.g., the other individuals in the group may not be accessing the location in an anomalous manner). In such an instance, the pre-existing access policy may be changed for the individual associated with the anomalous access event, but may not be changed (e.g., may be kept the same) for the other individuals in the group who are not access the location in an anomalous manner.

In embodiments in which the user (e.g., operator) of computing device 100 determines the access policy, the user can provide the access policy to computing device 100 (e.g., to the access control system) via user interface 110 previously described in connection with FIG. 1. For example, the user can enter the attributes of the access policy (e.g., an identification of the individual and/or group of individuals authorized to access the location, the time(s), duration(s), and/or day(s) for which access to the location is authorized, and/or the space(s) within the location where access is authorized) into a display on a screen of user interface 110. In embodiments in which computing device 100 (e.g., processor 112) determines the access policy, computing device 100 can automatically implement the access policy in the access control system.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for monitoring access to a location, comprising:
   recording, by a reader of an access control system located at an entrance of a location, data associated with an access event associated with the location, wherein the access event includes accessing a first area of the location at a first time and a second area of the location at a second time, and wherein the recorded data includes a day and time of the access event;
   determining, by a computing device of the access control system, whether the access event is an anomalous access event by comparing the recorded data associated with the access event to a statistical model of data associated with a number of non-anomalous access events associated with the location, wherein the access event is an anomalous access event when a difference between the first and second time is below a threshold time;
   assessing, by the computing device if the access event is determined to be an anomalous access event, the anomalous access event in order to determine whether the anomalous access event represents a significant gap in or threat to security of the location and, if so, what can be done in response to the anomalous access event, wherein assessing the anomalous access event includes:
      determining an anomaly classification confidence associated with the anomalous access event, wherein the anomaly classification confidence associated with the anomalous access event includes a value having one or more numbers or letters therein, the value representing a confidence level associated with the determination that the access event is an anomalous access event; and
      determining an anomaly severity associated with the anomalous access event, wherein the anomaly severity associated with the anomalous access event includes a value having one or more numbers or letters therein, the value representing an amount of seriousness with which the anomalous access event should be treated;
   changing, by the computing device, a pre-existing access policy for the location if the value of the anomaly classification confidence meets or exceeds a pre-defined threshold or if the value of the anomaly severity meets or exceeds a pre-defined threshold; and
   preventing, by the computing device, a subsequent access event to the location from occurring based on the changed access policy for the location.

2. The method of claim 1, wherein the location is a secured location.

3. The method of claim 1, wherein the access event associated with the location includes an entering of the location by an individual.

4. The method of claim 1, wherein the method includes determining the statistical model.

5. The method of claim 1, wherein the access event is an anomalous access event if the data associated with the access event deviates from the statistical model by at least a particular amount.

6. The method of claim 1, wherein the recorded data includes one or more of:
   a duration of the access event;
   an identification of an individual associated with the access event;
   a time of a first access event associated with the location in a day; and
   a frequency of access events associated with the location.

7. A computing device for monitoring access to a location, comprising:
   a memory configured to store a statistical model of data associated with a number of normal access events associated with a location; and
   a processor configured to execute executable instructions stored in the memory to:
      record, by a reader of an access control system located at an entrance of the location, data associated with an access event associated with the location, wherein the access event includes accessing a first area of the location at a first time and a second area of the location at a second time, and wherein the recorded data includes a duration of the access event;
      determine whether the access event is an anomalous access event by comparing the data associated with the access event to the statistical model, wherein the access event is an anomalous access event when a difference between the first and second time is below a threshold time;
      assess, if the access event is determined to be an anomalous access event, the anomalous access event in order to determine whether the anomalous access event represents a significant gap in or threat to security of the location and, if so, what can be done in response to the anomalous access event, wherein assessing the anomalous access event includes:
         determining an anomaly type associated with the anomalous access event;
         determining an anomaly classification confidence associated with the anomalous access event, wherein the anomaly classification confidence associated with the anomalous access event includes a value having one or more numbers or letters therein, the value representing a confidence level associated with the determination that the access event is an anomalous access event;
         determining an anomaly severity associated with the anomalous access event, wherein the anomaly severity associated with the anomalous access event includes a value having one or more numbers or letters therein, the value representing an amount of seriousness with which the anomalous access event should be treated; and
         determining a reliability associated with the statistical model; and
      change a pre-existing access policy for the location if the value of the anomaly classification confidence meets or exceeds a pre-defined threshold or if the value of the anomaly severity meets or exceeds a pre-defined threshold; and prevent a subsequent access event to the location from occurring based on the changed access policy for the location.

8. The computing device of claim 7, wherein the anomaly type associated with the anomalous access event is one of:
an edge anomaly, wherein an edge anomaly is an anomaly that corresponds to an anomalous access event that is at and/or near an edge of the statistical model;
a cluster anomaly, wherein a cluster anomaly is an anomaly that corresponds to an anomalous access event belonging to a pattern of anomalous access events; and
a gap anomaly, wherein a gap anomaly is an anomaly that corresponds to an anomalous access event within the statistical model that does not occur frequently.

9. The computing device of claim 7, wherein the anomaly severity associated with the anomalous access event is based on at least one of:
a level of security associated with the location;
a level of security associated with an individual accessing the location;
a level of security associated with a group of individuals accessing the location;
a level of security associated with a time of the access event; and
an amount of difference between the data associated with the access event and the statistical model.

10. The computing device of claim 7, wherein the reliability associated with the statistical model is based on an amount of data used to build the statistical model.

11. The computing device of claim 7, wherein the computing device includes a user interface configured to provide the assessment of the anomalous access event to a user of the computing device.

12. The computing device of claim 7, wherein the processor is configured to execute executable instructions stored in the memory to:
provide a single value that represents the determined anomaly type;
provide a single value that represents the determined anomaly classification confidence;
provide a single value that represents the determined anomaly severity; and
provide a single value that represents the determined reliability.

13. A method for monitoring access to a location, comprising:
recording, by a reader of an access control system located at an entrance of a location, data associated with an access event associated with the location, wherein the access event includes accessing a first area of the location at a first time and a second area of the location at a second time, and wherein the data includes an identification of an individual associated with the access event;

determining, by a computing device of the access control system, whether the access event is an anomalous access event by comparing data associated with the access event to a statistical model of data associated with a number of non-anomalous access events associated with the location, wherein the access event is an anomalous access event when a difference between the first and second time is below a threshold time;

assessing, by the computing device if the access event is determined to be an anomalous access event, the anomalous access event in order to determine whether the anomalous access event represents a significant gap in or threat to security of the location and, if so, what can be done in response to the anomalous access event, wherein assessing the anomalous access event includes:
determining an anomaly classification confidence associated with the anomalous access event, wherein the anomaly classification confidence associated with the anomalous access event includes a value having one or more numbers or letters therein, the value representing a confidence level associated with the determination that the access event is an anomalous access event; and
determining an anomaly severity associated with the anomalous access event, wherein the anomaly severity associated with the anomalous access event includes a value having one or more numbers or letters therein, the value representing an amount of seriousness with which the anomalous access event should be treated;

determining, by the computing device, an access policy for the location based on the anomalous access event and the assessment of the anomalous access event, wherein determining the access policy for the location includes changing a pre-existing access policy for the location if the value of the anomaly classification confidence meets or exceeds a pre-defined threshold or if the value of the anomaly severity meets or exceeds a pre-defined threshold; and preventing a subsequent access event to the location from occurring based on the changed access policy for the location.

14. The method of claim 13, wherein the access policy includes an identification of at least one of the following:
an individual authorized to access the location;
a group of individuals authorized to access the location;
a time when access to the location is authorized;
a duration for which access to the location is authorized;
a day when access to the location is authorized; and
a space within the location where access is authorized.

15. The method of claim 13, wherein the method includes building the statistical model using historical data associated with the location, wherein the historical data associated with the location includes the number of non-anomalous access events associated with the location.

* * * * *